Dec. 11, 1934.    B. HALL    1,983,754
REFRIGERATING METHOD AND MACHINE
Filed May 20, 1931    4 Sheets-Sheet 3

Dec. 11, 1934.   B. HALL   1,983,754
REFRIGERATING METHOD AND MACHINE
Filed May 20, 1931  4 Sheets-Sheet 4

INVENTOR
Bicknell Hall.
by Kenway & Witter Attys

Patented Dec. 11, 1934

1,983,754

UNITED STATES PATENT OFFICE 1,983,754

REFRIGERATING METHOD AND MACHINE

Bicknell Hall, Gloucester, Mass., assignor to Frosted Foods Company, Inc., Dover, Del., a corporation of Delaware Application May 20, 1931, Serial No. 538,649

31 Claims. (Cl. 62—114)

This invention relates to the art of freezing food products for purposes of preservation, storage and distribution. It consists in a novel method of handling liquid or semi-liquid or comminuted products and in an improved machine by which such products, or any products which it is desired to mold or shape and then freeze, may be handled in an advantageous manner.

An important field of use for my invention is in the freezing of fruit juices, crushed fruit or berries, cooked vegetables, ice cream, and the like. Such product, in accordance with my invention, may be collected in receptacles or molds of convenient size and shape and then converted into solid blocks or cakes in readiness for packing and storage. The procedure may be carried out continuously and automatically, if desired, and without skilled attention, it being necessary only to supply the soft product in bulk to the machine and to take it away in the form of solid blocks of suitable size for consumer packages.

The novel method of my invention is characterized by the step of passing the product to be frozen or congealed over and in contact with a refrigerating surface. Preferably, and as herein shown, the product may be confined within receptacles or molds formed in part by one or more refrigerating surfaces and in the passage of the product over such surface heat is extracted by conduction from the product and it may thus be frozen or congealed to any desired degree.

In another aspect my invention comprises a refrigerating machine including in its construction a heat-conductive plate with means for refrigerating the same and a receptacle movable to carry a food product in a path adjacent to or in contact with the surface of the plate to congeal the contained product. Preferably, the machine includes a plurality of such receptacles and these may be arranged for movement successively to a receiving or loading station wherein the product is supplied and then moved in a path over the heat-conductive plate for a sufficient interval to freeze or congeal the product. This operation may be carried on to best advantage by engaging the product at opposite sides between cooperative heat-conductive members, and in accordance with another feature of the invention, two or more such members are arranged in parallel spaced relation and a carrier member is provided which advances the product between them. Preferably and as herein shown, the carrier is provided with a plurality of receptacles or molds of each of which at least a part is formed by the surface or surfaces of the heat-conductive members so that the product contained in the molds is maintained in direct surface engagement with a refrigerating plate.

Operation in continuous cycle fashion is facilitated by employing heat-conductive plates of substantially circular contour, as in such a machine the molds may be moved in a circular path between receiving and discharging stations compactly arranged and the circulation of refrigerating medium in the heat-conductive plates is also facilitated. The machine of my invention, in its preferred embodiment, is, therefore, characterized by these features.

These and other features of the invention will be best understood and appreciated from the following description of a preferred embodiment thereof, selected for purposes of illustration and shown in the accompanying drawings, in which Fig. 1 is a view in side elevation of the machine;

Figure 1:
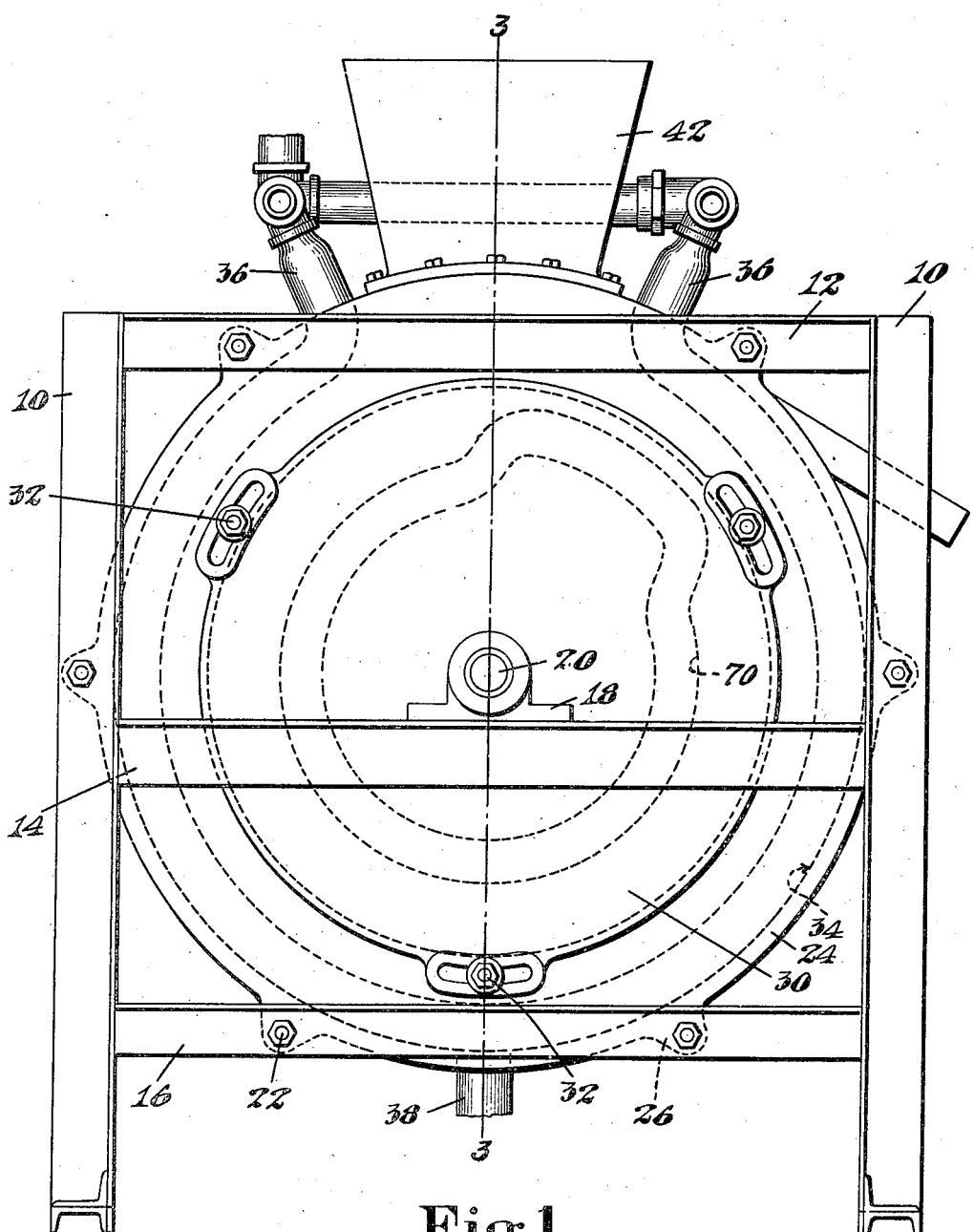

The machine herein shown comprises in its principal elements (1) a stationary frame, (2) vertically-disposed stationary refrigerating plates maintained in spaced relation to each other, and (3) a rotary carrier having a plurality of molds movable between the refrigerating plates and equipped with mechanism for ejecting the frozen product from the molds.

The frame is constructed of angle iron members and comprises corner uprights 10 connected by oppositely-arranged pairs of horizontal cross pieces 12, 14 and 16. The intermediate cross pieces 14 carry bearings 18 in which is journaled the horizontal shaft 20 of the carrier member, which will be described hereinafter. The various members of the frame are perforated to receive attaching bolts 22 by which the refrigerating plates are secured to the frame and maintained in position.

Figure 3:
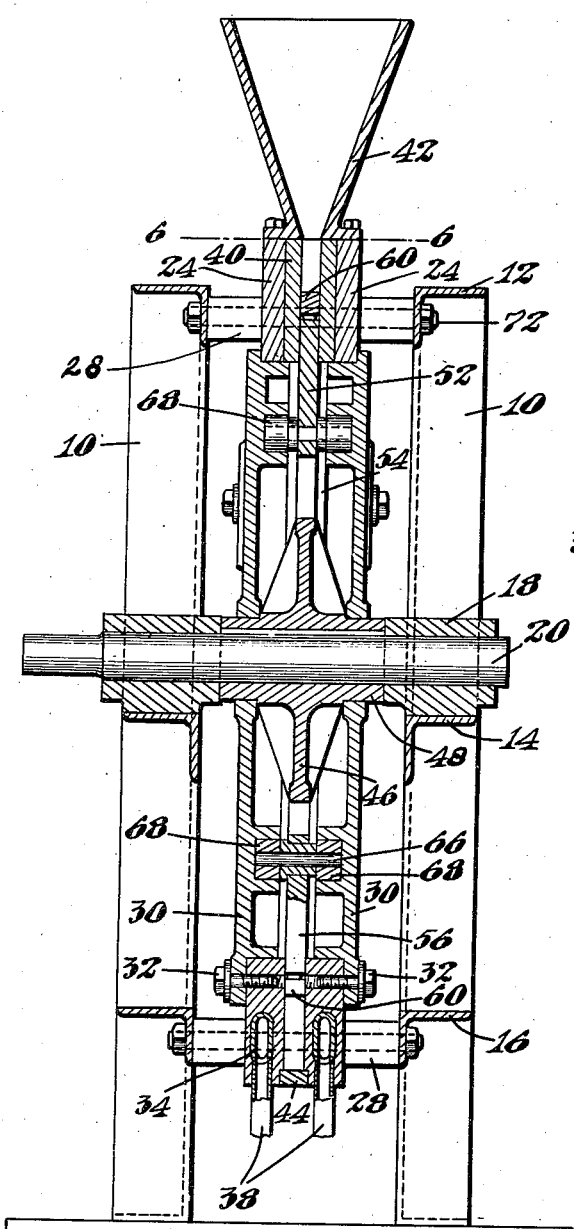
Fig. 3 is a view in vertical section taken on line 3—3 of Fig. 1.
Figure 4:
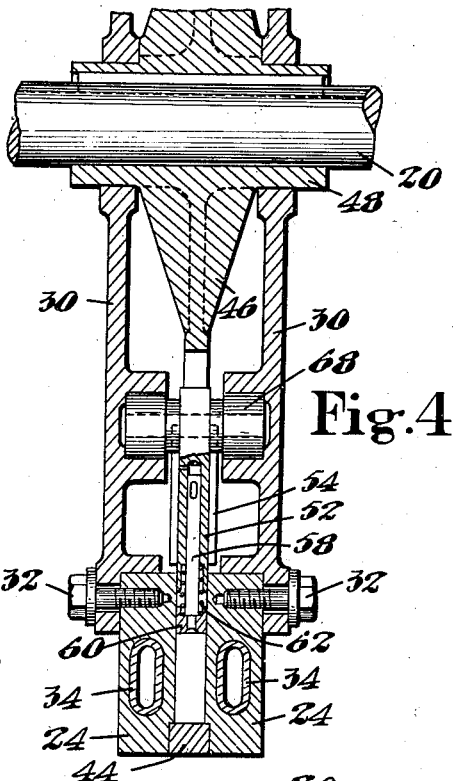
Fig. 4 is an enlarged sectional view taken on the oblique line 4—4 of Fig. 2.

The refrigerating elements of the machine comprise a pair of flat annular plates or rings 24 provided with ears 26 through which pass the attaching bolts 22 securing the plates in vertical position within the frame. Spacing sleeves 28 surround the bolts and are interposed between the frame and the outer faces of the plates, as best shown in Fig. 3. The plates 24 at their inner periphery are embraced by the flanged rims of a pair of disk members 30, centrally apertured to permit the passage of the shaft 20 and the hub of the carrier member. The disk members 30 have arcuate slotted ears through which are inserted separate attaching bolts 32 which secure the disk members to the stationary plates 24 and at the same time permit a rotary adjustment of the disk members 30 for a purpose which will presently appear.

The refrigerating plates or rings 24 are each provided with a circumferential passage which is herein shown as a flattened pipe 34 integrally cast in the body of the ring and provided at either end, near the upper edge of the plate, with spaced radially-extending inlet connections 36. At its lower edge each plate is provided with an outlet connection 38 leading downwardly from the lowest point in the circular pipe 34 which it contains.

It will be understood that by circulating brine, ammonia gas, or other refrigerating medium through the passages in the plates 24, these members may be maintained at a temperature sufficiently low to freeze a product carried circumferentially around between them. In the arrangement herein shown, calcium chloride brine, at a temperature of approximately $-40°$ F. is admitted to the two upper ends of each passage from suitable supply piping through the inlet connection 36 and discharged at the bottom of each passage through the outlet connection 38, from which the used brine may be conducted back to the refrigerating machine to be again cooled and used.

The refrigerating plates 24 are maintained with their opposite faces parallel and spaced from each other to form a passage along which the material to be frozen may be moved while in contact at its opposite sides with the heat-conductive walls of the plates. At its upper edge each plate is cut away at its inner face to receive a short sector 40 of heat-insulating material, such as hard fibre. These insulating sectors are flush with the inner faces of the plates 24, extending for approximately 20° of the circumference of the plates and define the loading station of the machine. The walls about the loading station are not refrigerated since the passage or pipe 34 terminates at either side thereof and the hard fibre sectors 40 are not heat-conductive. Secured to the upper edge of the plates immediately above the insulated sectors 40 thereof is a hopper 42 into which the material to be frozen may be poured and by which it is directed to the insulated space between the refrigerating plates 24.

Figure 2:
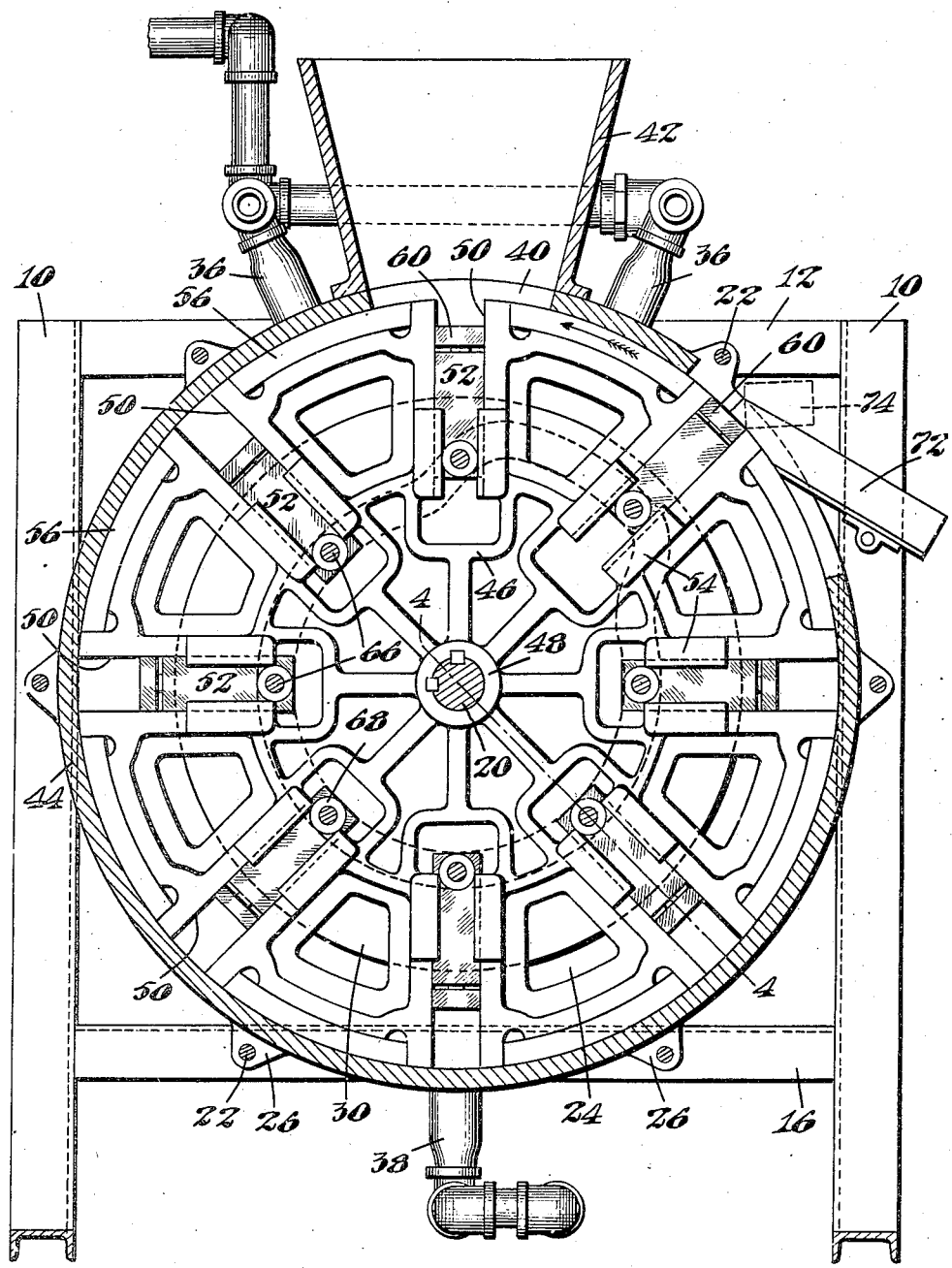
Fig. 2 is a similar view showing the refrigerating plate on one side removed.

The plates 24 are circumferentially shouldered adjacent to their outer edge to receive a spacing or filling ring 44 which extends about the entire periphery of the rings except for a supply gap, registering with and beneath the walls of the hopper 42, and a discharge gap located at the upper right-hand edge of the plates, as seen in Fig. 2. The bolts 22 serve to draw the plates 24 into firm engagement with the filler ring 44, making a substantially fluid-tight joint therewith.

Having described the stationary refrigerating elements of the machine, the rotary carrier will now be described: The shaft 20 carries a circular spider 46, the hub 48 of which fills the space between the bearings 18 and is keyed to the shaft 20. The spider 46 is of such diameter that it fits snugly within the ring 44 and of such width at its rim as exactly to fill the space between the refrigerating plates 24, being arranged to rotate between them when the shaft 20 is turned. The spider is provided with a series of radially-extending passages 50, eight of these passage being shown in the illustrated machine. The bottom or inner end of each passage is closed by a slide 52 which at its outer end extends always between the two refrigerating plates, while the body thereof is guided for radial movement in ways 54 formed in the body of the spider and located within the inner periphery of the rings 24. Between each radial passage 50 the spider 46 is provided with segments 56 of heat-insulating material which slide against the inner face of the filler ring 44. These segments tend to prevent freezing between the movable periphery of the spider and the inner face of the stationary filler ring and also reduce the refrigerating effect of the spider upon the material contained in the hopper 42 which might otherwise be frozen before it could pass into the mold or receptacle provided for it in the spider.

Figure 5:
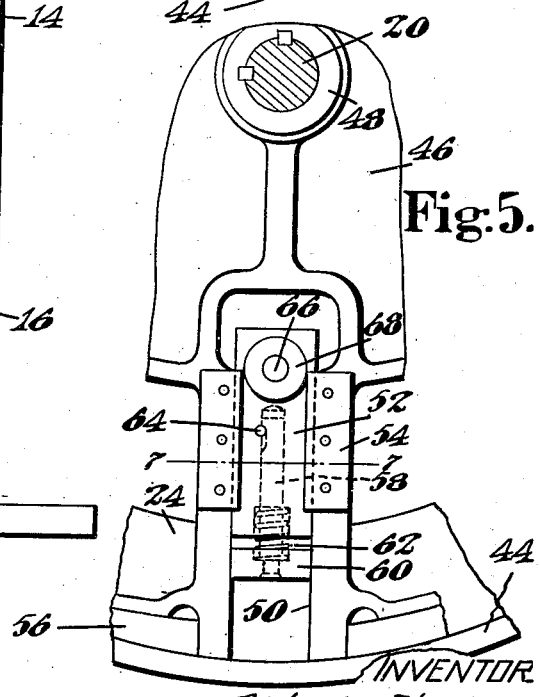
Fig. 5 is a fragmentary view in elevation, on an enlarged scale, of a portion of the mechanism shown in Fig. 2.
Figure 6:
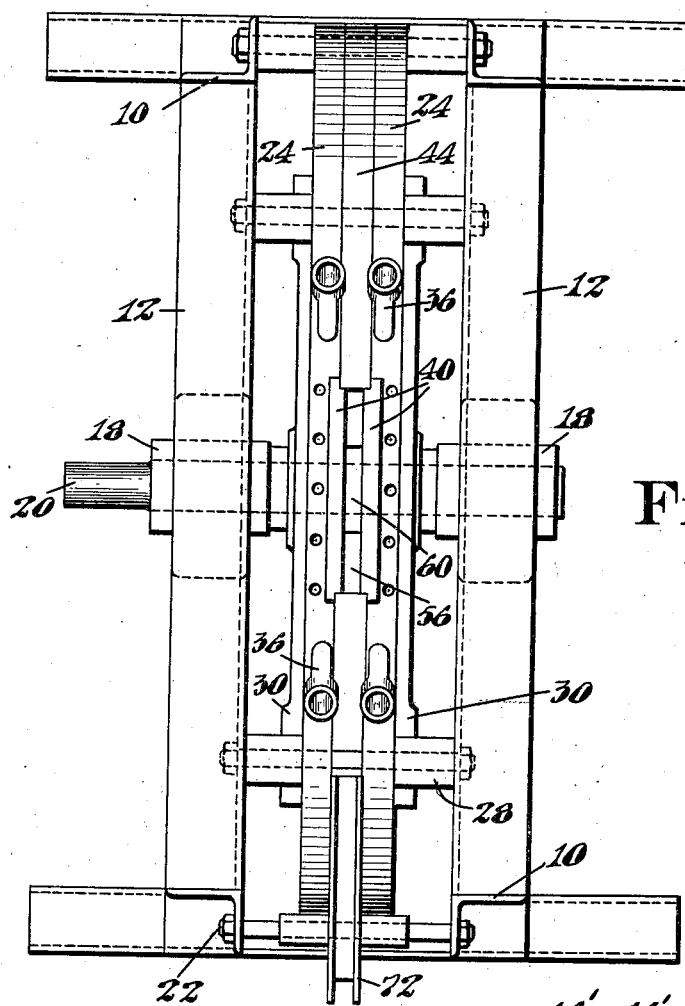
Fig. 6 is a plan view taken on line 6—6 of Fig. 3.
Figure 7:
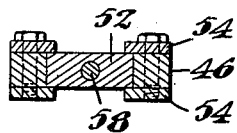
Fig. 7 is a sectional view taken on line 7—7 of Fig. 5.

Each slide 52 is provided with a radial bore in which is received a stem 58 carrying at its outer end a plate 60 which is arranged to fit snugly between the sides of one of the passages 50 and the opposite faces of the parallel plates 24, thus converting each passage of the spider into a mold or receptacle for receiving the product to be frozen. Each slide 52 and plate 60 is recessed to receive a compression spring 62 which encircles the stem 58 and normally holds the plate 60 a slight distance away from the end of the slide, as best shown in Fig. 5. The stem is provided with a groove near its inner end and limited in its movement by a cross pin 64 inserted in the slide so as to pass through the slot. This construction is for the purpose of providing a yielding wall in the mold which may be displaced during the freezing operation to allow for the expansion of the product caused by freezing.

Each slide 52 at its inner end is provided with a stud 66 which projects on both sides of the slide and carries at either end a cam roll 68. The cam rolls 68 run in cam tracks 70 which are formed in the inner faces of the disk members 30. The cam tracks are identical in their contour and, as shown in Fig. 1, are concentric with respect to the shaft 20 except for an outward throw adjacent to the discharge opening of the machine and an inward throw adjacent to the supply opening. The rotary adjustment permitted the disk members 30 by the arcuate slots above mentioned facilitates setting the disks properly to time the cams 70 in assembling the machine and to adjust the disks relatively to each other so as to bring their respective cam-tracks into coincident relation.

The filler ring 44, as already stated, is provided with a discharge opening through which the cake or block of frozen product is ejected after it has been carried throughout its path between the refrigerating plates 24. Adjacent to the discharge opening is provided a pivotally mounted trough or chute 72 which normally rides at its inner end upon the periphery of the spider 46, that is to say, upon the segment pieces 56 of the spider and the end walls of the passages 50. The outward throw in the cam tracks 70 is so located as to move the ejector plate 60 of each mold outwardly as the mold comes into position opposite the end of the chute 70. In Fig. 2 one of the frozen blocks 74 is represented in dotted lines as being discharged into the upper end of the chute 72. The pivotal mounting of the chute permits it to be temporarily displaced by the block 74 as the latter is ejected from its mold or receptacle.

The operation of the machine will be clear from the foregoing description but for convenience may be summarized as follows: Refrigerating medium is circulated through the plates 24 until their temperature is reduced to the desired degree. The shaft 20 is then slowly driven in a counter-clockwise direction from any suitable source of power and the spider 46 is rotated between the plates. The product to be frozen, in liquid or semi-liquid form, is poured into the hopper 42 and finds its way immediately between the plates 24 and into contact with that portion of the rim of the spider 46 which happens to be uppermost. As each mold approaches the receiving station, the cam track 70 acts positively to retract the slide 52, withdrawing its plate 60 to its extreme inward position, and thus presenting the mold, open to its full capacity, beneath the supply opening. The mold is at once filled by the product by gravity and continues to rotate slowly toward the left, as seen in Fig. 2, carrying its charge from between the insulating segments 74 into contact with and between the bodies of the refrigerating plates 24. The rotation of the spider continues and the filled mold is advanced in a circular path of approximately 120° between the refrigerating plates. During this interval the charge is frozen, displacing in its expansion the bottom plate 52 against the pressure of the spring 60. As soon as each individual mold or receptacle passes out of its receiving station, it is closed by being carried beneath the filler ring 44. Accordingly, the contents of the mold is retained therein even though the mold may be tilted or inverted before the same is completely frozen. When the mold reaches the discharge station the slide 56 is forced outwardly by the outward throw of the cam 68 and the block of frozen product is ejected from the spider, passing out of the machine by the chute 72.

It will be noted that the heat-conductive surfaces of the stationary plates 24 and the walls of the passages 50 in the spider 46 cooperate to form a series of rectangular molds for the fluid food product, and that these molds are appreciably greater in width than in thickness. The result is, therefore, that the greater surfaces of the product contained therein are maintained in movable contact with their confining surfaces while the lesser or edge surfaces are in relatively undisturbed contact with their confining surfaces. The step of ejecting the frozen cake is, therefore, facilitated since adherence between the side faces of the cake and the plates 24 is thus prevented and the only adherence to be overcome in freezing the cake is at its relatively small edge and bottom faces.

As each mold is carried along its circular path from its vertical loading position beneath the hopper 42 to its ejecting position, it is tipped or rotated through an angle of nearly 360°. In this movement, therefore, an internal flow of the fluid contents of the mold occurs in the unfrozen portions thereof. This action is important since it tends to improve the crystalline structure by preventing the formation of large crystals in the product.

While I have described my invention as carried out in producing frozen blocks from a liquid or semi-liquid food product, I contemplate also practicing it in connection with any food product capable of being delivered to molds or receptacles of the general character herein disclosed and moved therein over a refrigerating surface and I have in mind as another example of such product hamburg steak, country style sausage meat, and the like.

In the machine herein disclosed the product is arranged to be moved over the surface of stationary heat-conductive plates but it will be apparent that, if preferred, the heat-conductive plates may be moved and the food product maintained in a stationary position or that relative movement between the two may be secured in any convenient manner suited to the requirements of the conditions encountered.

Figure 8:
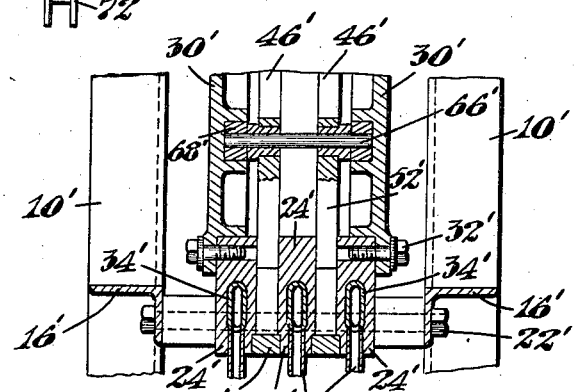
Fig. 8 is a fragmentary view similar to Fig. 3 but illustrating a modified machine which includes a plurality of refrigerating units.

The machine as illustrated in Figs. 1 to 7 includes a single pair of heat-conductive plates 24. It would be within the scope of my invention, however, to employ any number of plates desired and in Fig. 8 there is shown a portion of a machine having three plates 24' equally spaced to form two passages between them, in each of which travels a spider 46'. Disk members 30' are connected to the refrigerating plates 24' and are provided with cam tracks for operating slides 52' and in all other features the multiple construction illustrated in Fig. 8 is similar to the single spider construction illustrated in Figs. 1 to 7. It will be apparent that such a machine as that suggested in Fig. 8 will have twice the capacity of a single spider machine and that by adding additional plates the capacity may be correspondingly increased.

Having thus described my invention, what I claim as new and desire to secure by Letters Patent is:

1. The method of freezing food products, which consists in moving a measured volume of the same as a unit across a refrigerating surface and in contact therewith.

2. The method of freezing food products, which consists in confining the same within a mold, and moving the contained product in molded form across and relatively to a refrigerating surface and in contact therewith.

3. The method of freezing food products, which consists in confining the same within an open-sided mold, and moving the contained product in molded form across and relatively to spaced refrigerating surfaces in contact with opposite sides of the molded product.

4. The method of freezing food products, which consists in confining the same in molded form against a refrigerating surface, moving the confined product in molded form relatively to said surface and while in contact therewith until substantially frozen, and then discharging the frozen block.

5. The method of freezing fluid food products, which consists in confining predetermined volumes thereof between two sets of surfaces, advancing the product by movement of one set of surfaces across the other set of surfaces, and refrigerating the product by said other surfaces.

6. The method of freezing fluid food products, which consists in confining separate bodies thereof between cooperating stationary and movable surfaces, molding said bodies to make their greater area of contact with said stationary surfaces, advancing the molded bodies relative to said stationary surfaces by movement of the movable surfaces, and refrigerating them by the action of said stationary surfaces.

7. The method of freezing fluid food products, which consists in confining a body of fluid between surfaces which cooperate to form a mold therefor, refrigerating certain of said surfaces, and causing relative movement to take place between those surfaces and the molded fluid body as a unit while the latter is being congealed.

8. The method of freezing fluid food products, which consists in shaping a measured volume thereof into a molded form making contact in an extended area with a heat-conductive surface, and moving said molded form as a unit over and relatively to said surface, congealing the product and at the same time preventing its adherence to said surface.

9. The method of freezing fluid food products, which consists in confining measured volumes thereof and moving the latter relatively to spaced heat-conductive surfaces to congeal the product and meantime to cause an internal flow to take place in the body of the liquid as the freezing progresses.

10. A refrigerating machine comprising a heat-conductive plate, means for refrigerating the same, and a receptacle movable relatively thereto for carrying a food product in a path adjacent to the surface of said plate to congeal the product.

11. A refrigerating machine having heat-conductive elements, a reservoir for a supply of fluid food product, a carrier for separating and enclosing measured bodies of fluid product from said supply and bringing them as separate units successively into the range of said heat-conductive elements, whereby each body is converted into a frozen cake, and means for removing said cakes one after another from the machine.

12. A refrigerating machine comprising a heat-conductive plate having refrigerating connections, a carrier having a mold closed in part by the surface of said plate, means for closing each mold after it has been filled, and means for moving the carrier to pass a product in molded form and as contained in the mold across the surface of said plate and in contact therewith to congeal the same.

13. A refrigerating machine comprising a stationary heat-conductive plate having refrigerating connections and a smooth surface of extended area, a carrier movable in a path adjacent to said plate and having a receptacle for maintaining a product to be frozen in contact with the surface of the plate while the product is moved by the carrier.

14. A refrigerating machine comprising a stationary chambered heat-conductive plate having refrigerating connections and a vertically-disposed face, a carrier movable in a path adjacent to said plate and having a receptacle arranged to be presented in receiving position at the upper edge of the plate and then moved away from said position in a predetermined path while maintaining its contained product in contact with the face of the plate.

15. A refrigerating machine comprising a heat-conductive plate shaped to receive internally a refrigerating medium and having a substantially vertically-disposed face, a carrier movable in a path adjacent to said face and having a receptacle arranged to be presented right side up in receiving position at the upper edge of the plate and then moved by the carrier with its contained product in contact with said face into an inverted position, and means for closing the receptacle while inverted.

16. A refrigerating machine comprising a circular plate chambered to receive a refrigerating medium, and a carrier having a receptacle arranged to maintain its contained product in contact with said plate and being movable in a circular path to pass the product circumferentially over the plate.

17. A refrigerating machine comprising a circular plate chambered to receive a refrigerating medium, a carrier having a receptacle arranged to maintain its contained product in contact with said plate and being movable in a circular path to pass the product over the plate, and an ejecting plate in the receptacle movable at one point in its path to receive an unfrozen product and at another to eject the same product in frozen or congealed condition.

18. A refrigerating machine comprising a heat-conductive plate having an opening traversed by a rotary shaft and a passage for refrigerating medium disposed substantially concentrically with respect to said shaft, a carrier mounted upon said shaft and having a receptacle for a product which is caused to pass about the plate in a path corresponding to said passage when the carrier is rotated.

19. A refrigerating machine comprising a ring-like heat-conductive plate chambered to receive a refrigerating medium, a carrier mounted concentrically within the periphery of the plate and having a receptacle maintained in contact with a face of the plate, an ejecting member in the receptacle, and mechanism located within the periphery of the plate for automatically retracting and advancing said member.

20. A refrigerating machine comprising a heat-conductive plate chambered to receive a refrigerating medium and having a substantially circular face, a rotary carrier having a plurality of receptacles movable successively into position to receive a product and then to pass the contained product across the face of the plate to congeal the same, and means for ejecting the congealed product from each receptacle successively at a point remote from the receiving position.

21. A refrigerating machine comprising a plurality of heat-conductive members having parallel faces spaced from each other, a receptacle arranged to contain a product in contact at its opposite sides with said spaced faces, means for moving the receptacle relatively to said faces, and means for refrigerating said members.

22. A refrigerating machine comprising a plurality of heat-conductive members chambered to receive a refrigerating medium and having spaced parallel faces, a carrier having product-receiving molds disposed between said spaced faces and formed in part thereby, and means for moving the carrier to advance the contained product between said faces and in contact therewith at its opposite sides.

23. A refrigerating machine comprising a plurality of circular heat-conductive plates chambered to receive a refrigerating medium, a ring arranged to close the space between said plates at their periphery, and a rotary carrier having a plurality of receptacles for product to be frozen, which receptacles are arranged to be closed by said ring.

24. A refrigerating machine comprising a heat-conductive plate chambered to receive a refrigerating medium and having a contact surface, and a closed mold movable in a path adjacent to said surface and having a yieldable section therein to permit expansion of the contained product in freezing.

25. A refrigerating machine comprising a heat-conductive member chambered to receive a refrigerating medium and having a heat-insulating section therein, and a mold movable from a product-receiving position adjacent to said section in a path adjacent to said member to subject a contained product to the refrigerating action thereof.

26. The method of freezing food products, which consists in dividing the same into separate units and moving the units individually relatively to spaced refrigerating surfaces in contact with opposite sides of the said units.

27. The method of freezing fluid food products, which consists in dividing a large volume of the fluid product into a plurality of smaller fluid bodies of predetermined volume and rectangular shape, and passing the latter successively between refrigerated heat-conductive plates and thereby freezing them while they are maintained individually intact.

28. The method of freezing fluid food products, which consists in intermittently drawing from a supply of the fluid product separate fluid bodies, imparting to each body a flat-sided shape and then, while maintaining them individually intact, converting them one after another directly into solid frozen cakes.

29. The method of freezing fluid food products, which consists in establishing a relatively large supply of the product, separating therefrom measured amounts of the product while in fluid condition and at regular intervals, then subjecting such measured amounts of the fluid product successively to a progressive freezing action thereby converting them directly into individual frozen cakes.

30. A refrigerating machine having a reservoir for a supply of fluid food product, means for separating measured amounts of fluid product from said supply and shaping them into individual bodies of rectangular shape, and means for subjecting said separate bodies, while maintained intact, each to a progressive freezing action thereby converting it directly into a solid frozen cake.

31. A refrigerating machine having a reservoir for a supply of fluid food product, a continuously moving carrier having spaced molds therein for separating measured bodies of fluid product from said supply and conveying them as units along a predetermined path, and refrigerating elements for freezing the mold contents while being so conveyed and while maintained individually intact to convert it directly into solid frozen cakes.

BICKNELL HALL.